United States Patent [19]
Duke

[11] Patent Number: 4,844,121
[45] Date of Patent: Jul. 4, 1989

[54] RV SEWAGE LINE ASSEMBLY

[76] Inventor: Robert L. Duke, 4154 Arden St., Clemmons, N.C. 27012

[21] Appl. No.: 256,453

[22] Filed: Oct. 12, 1988

[51] Int. Cl.⁴ .............................................. A01G 25/09
[52] U.S. Cl. ................................ 137/615; 137/355.16; 137/899; 248/87
[58] Field of Search ................... 137/615, 899, 355.16; 248/49, 87

[56] References Cited

U.S. PATENT DOCUMENTS 3,496,959 2/1970 Wolfe et al. ......................... 137/899
3,809,348 5/1974 DiLaura ................................ 248/87
4,133,347 1/1979 Mercer ................................ 137/899
4,650,224 3/1987 Smith .................................. 137/899

*Primary Examiner*—A. Michael Chambers

[57] ABSTRACT

A temporary sewage line assembly is provided for an RV or other vehicles which may be utilized in a variety of hook ups. The assembly includes an elongated, reducing connector, a wash outlet on the connector, a telescoping conduit which pivotally attaches to the connector and a downspout for fitting within a stationary sewer line. The sewage assembly is formed from a rigid plastic which is constructed not to leak and which can be easily cleaned after use and disassembled.

8 Claims, 2 Drawing Sheets

RV SEWAGE LINE ASSEMBLY

BACKGROUND OF THE INVENTION

1. Field Of The Invention

The present invention pertains to temporary sewage lines and particularly to external sewage lines for recreational vehicles and the like.

2. Description Of The Prior Art And Objectives Of The Invention

In recent years the increase in recreational vehicles (RVs) has been widespread throughout the United States and elsewhere and RVs are now familiar sights on highways and campgrounds. Prices of RVs will vary from several thousand dollars to the hundred thousand dollar range depending on the amount of luxury, size and convenience desired. Campgrounds are increasing parking spaces and other accommodations for such vehicles which require water, sewage and other facilities during their stay. Campgrounds and RV parks include with each parking space a 3½" to 4" sewage ID pipe line which extends approximately eight (8) inches out of the ground. A rubber seal or gasket may also be provided in some areas whereby the RV owner, upon parking in the particular lot or space simply use a flexible sewage line from the vehicle waste storage tank to the line provided and the use of a flexible sewage line appears reasonable and convenient. However, it is difficult to connect and disconnect the flexible, temporary sewage line without spillage occuring, and such spillage is environmentally hazardous, unsanitary and making the hookup is a most unpleasant task for the RV owner. Also, temporary sewage hookups using flexible lines are a nuisance to the RV park managers and maintenance personnel that must deal with the spillage which can amount to 10 gallons of raw sewage deposited on top of the ground when conventional fexible lines are disconnected.

With these and other disadvantages of conventional RVs having external temporary, flexible sewage lines, the present invention was conceived and one of its objectives is to provide an external sewage line for an RV which is easy to assemble and connect and which will eliminate sewage spillage and clean-up.

It is another objective of the present invention to provide an external RV sewage line which can be easily adjusted to a variety of different permanent sewage line positions and conditions.

It is yet another objective of the present invention to provide an RV sewage line assembly which is light in weight, durable and can easily be cleaned after use by use of a waste outlet on a reducer connector.

It is also an objective of the present invention to provide an RV sewage line assembly which will remain off of the ground during use and which will insure proper fluid flow therethrough.

Other objectives of the present invention will become apparent to those skilled in the art as a more detailed description of the invention is presented below.

SUMMARY OF THE INVENTION

The aforesaid and other objectives are realized by providing a sewage line assembly for a recreational vehicle which is formed from rigid polyvinyl chloride (PVC) pipe which includes an elongated reducing connector, a telescoping section which pivotally attaches to the elongated connector and a downspout for positioning in a permanent vertical aboveground sewer line. A wash outlet is provided on the elongated connector and provides the user with a quick and convenient way to flush the sewage line assembly after use has termined and prior to disassembling and storage.

BRIEF DESCRIPITION OF THE DRAWINGS

FIG. 1 illustrates in exploded fashion a sewage line assembly of the invention;

FIG. 2 demonstrates a top view of a typical installation on a recreational vehicle;

FIG. 3 shows in enlarged form the line support; and

FIG. 4 demonstrates a cross sectional view of the tapered elongated connector.

DESCRIPITION OF THE PREFERRED EMBODIMENT

The preferred form of the invention comprises a rigid PVC sewage line assembly for an RV, camper or other temporary positioned structure and includes an elongated connector which has a wash outlet. Pivotally joined to the elongated connector is a telescoping conduit which extends from approximately 55 to 110 inches in length and attached to the telescoping conduit at the end opposite the elongated connector is a downspout for placement in a standard sewage line as provided in RV parks and elsewhere. The pivotal attachment and telescoping feature provide ease in hook up to a variety of permanent sewage line placements and promotes sanitation.

DETAILED DESCRIPTION OF THE DRAWINGS AND OPERATION OF THE INVENTION

Figure 1:
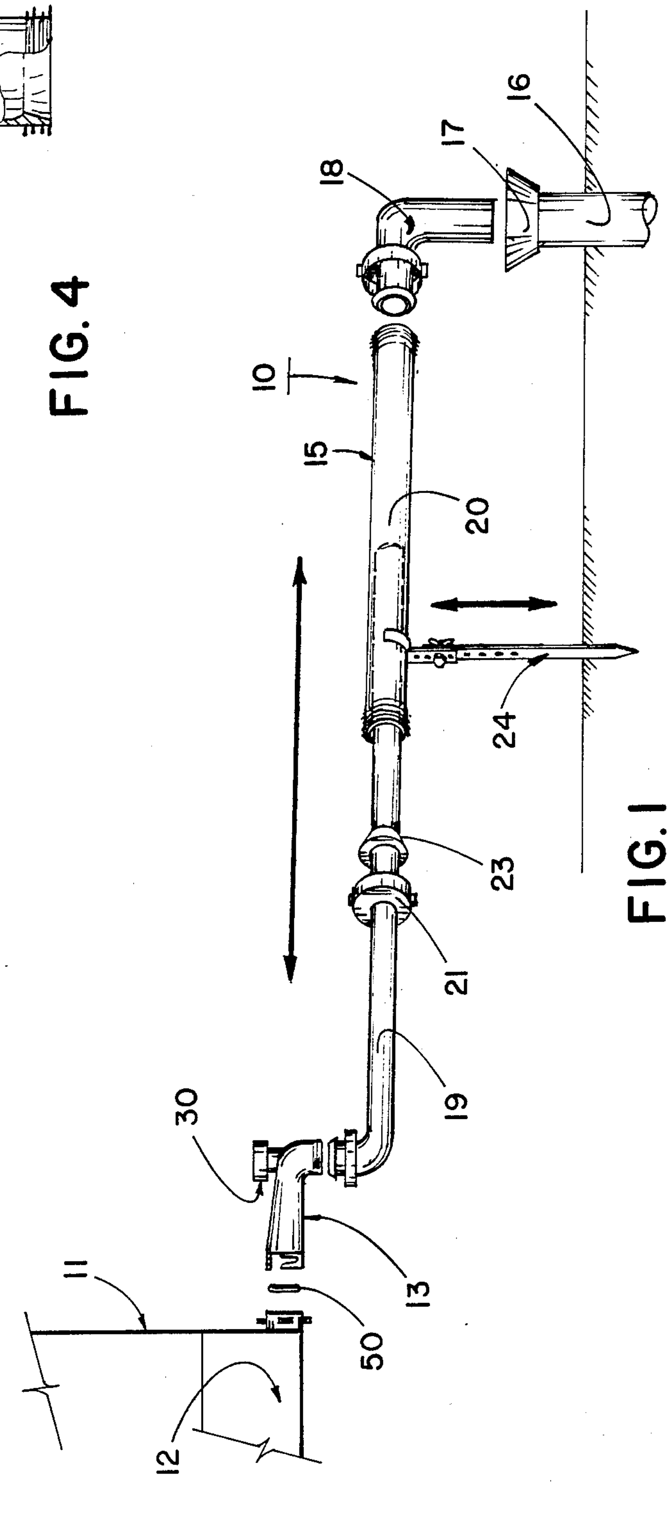
Figure 2:
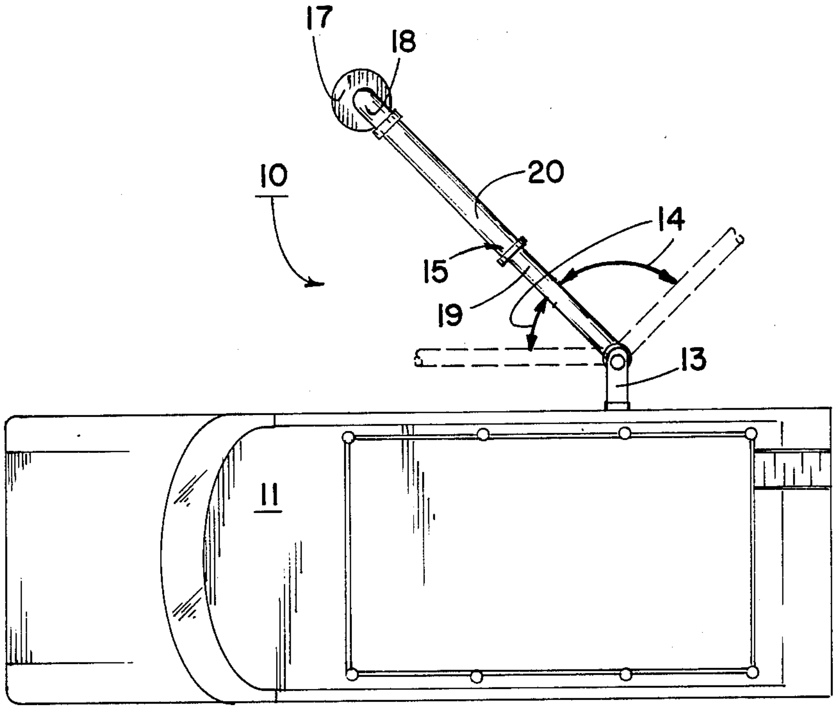

Turning now to the drawings, FIG. 1 demonstrates sewage line assembly 10 in an exploded and disassembled view for attachment to recreational vehicle 11 having waste storage tank 12 which is mounted on the underneath and left side of vehicle 11, as seen in FIG. 2. O-ring 50 provide a leak proof seal between tank 12 and connector 11. Assembly 10 includes elongated connector 13 which is pivotally joined to telescoping conduit 15 and may be positioned as shown by directional arrows 14 in FIG. 2. Connector 13 is shown in a rigid configuration but could be manufactured to bend or pivot if desired. Once tightened in place connecter 13 and telescoping conduit 15 are non-movable. Telescoping conduit 15 may pivot approximately 360° for ease and convenience in connecting to permanent sewer line 16 which is attached to a septic tank (not shown) or other suitable sewage disposable system.

Figure 4:
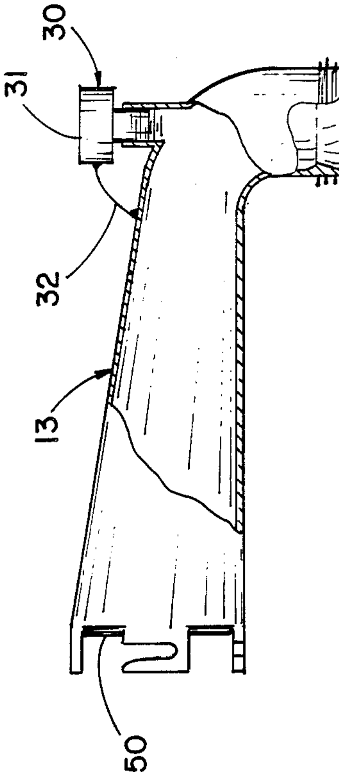
Figure 3:
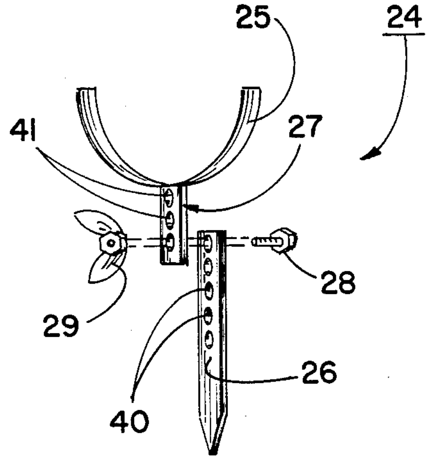

Also, shown in FIG. 1 is gasket 17 which is provided by some RV parks and may be formed from foam rubber or other flexible material to insure a tight fit between sewer line 16 and downspout 18 to prevent escape of noxious fumes from the septic tank. Telescoping conduit 15 has a small diameter inner line 19 and a larger diameter outer line 20. It should be understood that outer line 20 slides backward and forward over inner line 19 and is affixed therealong by tightening inner line nut 21 to threaded end 22 of outer line 20. Seal 23 fits within nut 21 and provides a tight, leakproof joint and seal 23 can be moved along inner line 19 as can nut 21 to extend or contract telescoping conduit 15. Outer line 20 is held by support 24 which is seen in an enlarged view in FIG. 3. Support 24 includes stirrup 25 for releasably receiving outer line 20 and also includes an adjustable leg 26 which is variably positioned along extension 27 by the desired placement of bolt 28 which nut 29 through openings 40 and 41. As would be understood, adjustable leg 26 can be moved upwardly and downwardly along stirrup extension 27 to provide the required fall or slant for proper sewage flow through telescoping conduit 15 and to provide support thereto. Telescoping conduit 15 is pivotally attached to elongated connector 13 as seen in FIG. 4 and connector 13 tapers from an approximate 3" ID at its forward end (nearest the RV) to a 2 ¾" ID at its rear end to act as a means to reduce the flow diameter. Wash outlet 30 seen in FIG. 4 includes a releasably cap 31 held in place by tie cord 32. It should be understood that cap 31 can be threadably affixed to wash outlet 30 or can be otherwise joined thereto for quick release and tie cord 32 prevents cap 31 from being lost or being dropped to the ground below which may be damp or unsanitary.

Elongated connector 13, telescoping conduit 15 and downspout 18 are all formed from a rigid PVC plastic material dimensioned as appropriate for the particular circumstances although other plastics may be used. Sewage line 16 shown in FIG. 1 may have a 4" ID and accordingly downspout 18 would be sized to fit therein. Wash outlet 30 can be configured to have a 1½" ID to accept a conventional garden hose nozzle so the user, before movement of the RV can run fresh water therethrough for cleaning purposes of assembly 10 prior to disassembly and storage thereof.

The illustrations and examples provided herein are for explanatory purposes and are not intended to limit the scope of the appended claims.

I claim:

1. A piping assembly for removing sewage from the waste system of a vehicle comprising: a connector member, said connector member for attachment to the waste system, a wash outlet, said outlet joined to the upper side of said connector member, a telescoping conduit, said conduit having a small inner line and a larger outlet line, said inner line pivotally attached to said connector member to move in a circular direction therearound, a washer seal, a nut, said seal and saidi nut movably positioned on said inner line, said outer line having a threaded end, said nut for receiving said threaded end for releasably fixing said inner and said outer lines to each other to provide a desired length of said telescoping conduit.

2. A piping assembly as claimed in claim 1 formed from a rigid PVC plastic.

3. A piping assembly as claimed in claim 1 and including a quick-disconnect cap, said cap for closing saidi wash outlet.

4. A piping assembly as claimed in claim 1 and including a downspout, said downspout attached to said outer line.

5. A piping assembly as claimed in claim 1 and including a support member, said support member releasably attached to said outer line, said support member having an adjustable leg.

6. A piping assembly as claimed in claim 1 wherein said connector member including flow reducing means.

7. A piping assembly for removing sewage as claimed in claim 1 and including a downspout, said downspout affixed to said telescoping conduit.

8. A piping assembly for removing sewage as claimed in claim 1 and including a support member, said support member for releasable attachment to said telescoping conduit.

* * * * *